Figure 1:
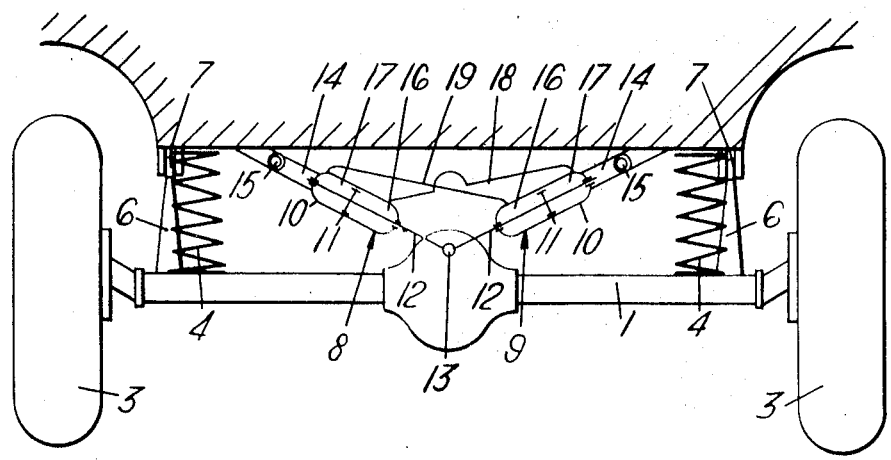

United States Patent

[11] 3,602,524

| [72] | Inventor | Johann Rutzenhofer<br>Russelsheim am Main, Germany |
|---|---|---|
| [21] | Appl. No. | 836,466 |
| [22] | Filed | June 25, 1969 |
| [45] | Patented | Aug. 31, 1971 |
| [73] | Assignee | General Motors Corporation<br>Detroit, Mich. |
| [32] | Priority | July 11, 1968 |
| [33] | | Germany |
| [31] | | P 17 55 923.8 |

[54] DEVICE FOR HINDERING THE LATERAL MOVEMENT OF A MOTOR VEHICLE BODY RELATIVE TO AN AXLE OF THE VEHICLE
5 Claims, 2 Drawing Figs.

[52] U.S. Cl. ..................................... 280/112 A, 280/124
[51] Int. Cl. ..................................... B60g 21/06
[50] Field of Search............................ 280/112.1

[56] References Cited
UNITED STATES PATENTS

| 2,095,677 | 10/1937 | Schoepf | 280/112.1 |
| 2,474,471 | 6/1949 | Dolan | 280/112.1 |
| 3,044,799 | 7/1962 | Fiala | 280/112.1 |

Primary Examiner—Philip C ...
Attorneys—J. L. Carpenter and E. J. Biskup

ABSTRACT: For use in a motor vehicle for hindering (that is, reducing or completely preventing) lateral movement of the vehicle body relative to an axle of the vehicle by means of two members each connected to the vehicle body and to the axle, the members consist of an opposed pair of hydraulic piston and cylinder arrangements each disposed at an angle of less than 90° relative to the respective outboard portion of the axle, and there are respective hydraulic connections between the cylinder space behind the piston in each of the arrangements and the cylinder space in front of the piston in the other of the arrangements, such that in operation mutual pressure buildup in the cylinder spaces of the arrangements is effective to hinder lateral movements of the vehicle body relative to the axle, but the hydraulic piston and cylinder arrangements do not appreciably impede vertical movements of the vehicle body.

PATENTED AUG 31 1971 3,602,524

Inventor
Johann Rutzenhofer
BY
E.J. Biskup
Attorney

DEVICE FOR HINDERING THE LATERAL MOVEMENT OF A MOTOR VEHICLE BODY RELATIVE TO AN AXLE OF THE VEHICLE

This invention relates to devices for hindering lateral movement of a motor vehicle body relative to an axle of the vehicle by means of two members each connected to the vehicle body and to the axle.

For hindering relative lateral movement between a vehicle body and axle, a Panhard rod may be used, that is, a cross link which extends approximately transversely of the longitudinal direction of the vehicle and of which one end is connected to the body and the other end is connected to the axle. Alternatively, a Watts linkage may be used, in which each of two members as aforesaid is connected to a double-armed lever which is rotatably secured to the axle, for example to a differential housing of a rear axle. However, a disadvantage of the Watts linkage is the space required for the attachment of the members to the body, especially a lower member of the linkage, which needs to be articulated to the body at a very low position.

The present invention is concerned with a lateral guiding arrangement for the vehicle body relative to the axle which avoids the disadvantage of the Watts linkage, and which in particular requires no more space than a Panhard rod but produces a better effect than a Panhard rod.

According to the invention, in a device of the kind already referred to, the members each consist of an hydraulic piston and cylinder arrangement which is disposed at an angle of less than 90° relative to the outboard portion of the axle, the cylinder space behind the piston in each of the arrangements being in communication with the cylinder space in front of the piston in the other of the arrangements, such that mutual pressure build up in the cylinder spaces of the arrangements is effective to hinder lateral movements of the vehicle body relative to the axle, but hydraulic piston and cylinder arrangements do not appreciably impede vertical movements of the vehicle body.

The arrangements may be disposed at an angle of less than 45° relative to the outboard portions of the axle, for example they may even be disposed substantially parallel to the axle.

The piston and cylinder arrangements are conveniently disposed symmetrically with respect to the longitudinal center plane of the vehicle. Both the arrangements may for instance be connected to the axle by way of their piston rods. The two arrangements are advantageously hingedly attached to the axle, for example to a differential housing of the rear axles, at a common point.

Figure 2:
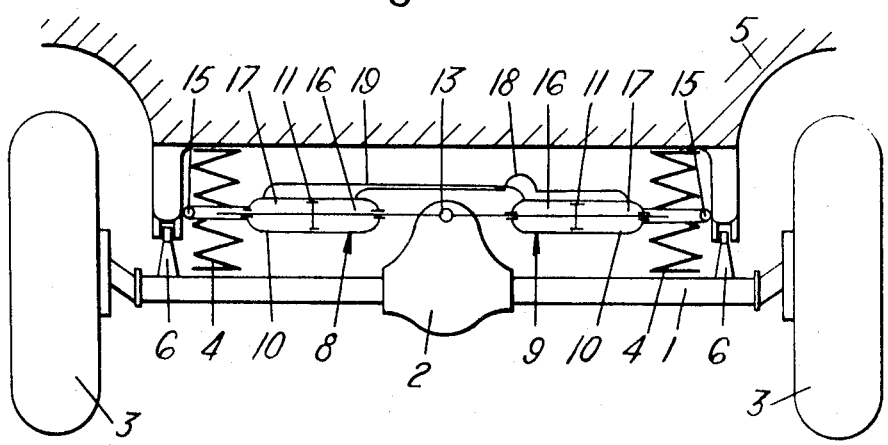

Two embodiments of a device according to the invention are illustrated in the accompanying drawing, in which:

FIG. 1 schematically shows a rear elevation of the rear axle of a motor vehicle and the adjacent portion of the vehicle body, and illustrates one embodiment of the invention; and FIG. 2 is a view similar to FIG. 1 but illustrating a second embodiment of a device according to the invention, utilizing a different disposition of a pair of piston and cylinder arrangements.

In the embodiment shown in FIG. 1 of the drawing, a motor vehicle has a rigid rear axle 1 including a differential gear housing 2 containing gearing for driving the rear wheels 3 of the vehicle. The rear axle 1 is resiliently connected to the vehicle body 5 by means of a pair of coil springs 4, and is guided by longitudinal links 6 which are rigidly connected at their rear ends to the rear axle, and are hingedly connected at their front ends to the vehicle body 5 at points 7.

For the purpose of hindering lateral movement of the body 5 relative to the rear axle 1, a pair of piston and cylinder arrangements 8 and 9 are arranged between the axle and the body 5. Each of these arrangements includes a cylinder 10 within which a piston 11 is guided, with a piston rod 12 for the piston 11 passing through a seal at the lower end of the cylinder 10 and being hingedly secured to the rear axle differential housing 2 at a point 13. In the upward direction, each piston rod 12 passes through a seal at the upper end of the cylinder 10. The cylinder 10 is provided with an extension 14 by means of which the cylinder is hingedly secured to the vehicle body at a point 15, the upper end of the piston rod 12 moving within this extension 14 in response to rise and fall movements of the vehicle body.

Each piston 11 divides its cylinder 10 into a lower space 16 and an upper space 17, both spaces being filled with a hydraulic fluid, namely oil. The lower space 16 of the arrangement 8 is connected to the upper space 17 of the arrangement 9 by way of a line 18, and similarly the lower space 16 of the arrangement 9 is connected to the upper space 17 of the arrangement 8 by way of a line 19. In other words, the space behind the piston in each of the arrangements is in communication with the space in front of the piston in the other of the arrangements.

FIG. 1 shows the piston rods 12 of the arrangements 8 and 9 as being hingedly mounted on the rear axle differential gear housing 2 at a common point 13. From this point, the arrangements 8 and 9 extend upwards in an obliquely outward direction so as to be disposed at an angle of approximately 30° with the respective outboard portions of the axle, although the exact angle varies during rise and fall movements of the vehicle body 5.

Lateral movements of the vehicle body 5 relative to the rear axle 1 are hindered by the piston and cylinder arrangements 8 and 9 as follows: any tendency of the body 5 to move towards the right, for example, as seen in FIG. 1, causes the space 17 of the arrangement 8 to decrease in volume because the piston 11 is moved into the arrangement 8, and fluid from the space 17 is therefore forced by way of the line 19 into the space 16 of the arrangement 9. During this movement of the body 5, however, this space 16 also decreases in volume, because of the movement of the cylinder 10 obliquely upward and to the right relative to the piston 11, and so a pressure build up is produced which resists the lateral displacement of the body 5. Additionally, in the space 17 of the arrangement 8 and in the space 16 of the arrangement 9 a pressure build up is likewise produced which resists the lateral displacement of the body 5.

There is a similar resistance to lateral movement of the body when the body tends to move towards the left.

If the body 5 moves vertically downwards, corresponding to part of the normal rise and fall "ride" movements of the vehicle body, the arrangements 8 and 9 offer no resistance, because the fluid is then able to flow from the spaces 17 by way of the lines 18 and 19 into the spaces 16 since these spaces 16 increase in volume corresponding to the decrease in volume of the spaces 17.

Thus, to summarize, lateral movement of the vehicle body tends to produce movement of the two pistons in opposite senses, as a result of which the cross over connections 18 and 19 produce a pressure build up tending to hinder such movement, whereas vertical movement of the vehicle body produces movement of the two pistons in the same sense, the resulting fluid displacement being accommodated by reason of the cross over connections without any pressure build up.

In the embodiment shown in FIG. 2 of the drawing, the piston and cylinder arrangements 8 and 9 are disposed substantially parallel to the axle 1. The mode of operation is, however, no different from that of the system described in relation to FIG. 1.

Although two specific embodiments have been particularly described for the purpose of illustrating the invention, it ill be appreciated that numerous modifications are possible within the scope of the following claims.

I claim:

1. A device for hindering lateral movement of a motor vehicle body relative to an axle of the vehicle, comprising an opposed pair of hydraulic piston and cylinder arrangements each of which is connected to the vehicle body and to the axle and is disposed at an angle of less than 90° relative to the outboard portion of the axle, and respective hydraulic connections between the cylinder space behind the piston in each of the arrangements and the cylinder space in front of the piston in the other of the arrangements, such that in operation mutual pressure build up in the cylinder spaces of the arrangements is effective to hinder lateral movements of the vehicle body relative to the axle, but the hydraulic piston and cylinder arrangements do not appreciably impede vertical movements of the vehicle body.

2. A device for hindering lateral movement of a motor vehicle body relative to an axle of the vehicle, comprising an opposed pair of hydraulic piston and cylinder arrangements which are arranged symmetrically with respect to the longitudinal central plane of the vehicle and which are connected to respective points on the vehicle body and to a common point on a differential housing of the axle and are each disposed at an angle of less than 90° relative to the outboard portion of the axle, and respective hydraulic connections between the cylinder space behind the piston in each of the arrangements and the cylinder space in front of the piston in the other of the arrangements, such that in operation mutual pressure build up in the cylinder spaces of the arrangements is effective to hinder lateral movements of the vehicle body relative to the axle, but the hydraulic piston and cylinder arrangements do not appreciably impede vertical movements of the vehicle body.

3. A device for hindering lateral movement of a motor vehicle body relative to an axle of the vehicle, comprising an opposed pair of hydraulic piston and cylinder arrangements which are arranged symmetrically with respect to the longitudinal center plane of the vehicle and each of which is hingedly connected to the vehicle body and to the axle and is disposed at an angle of less than 45° relative to the outboard portion of the axle, and respective hydraulic connections between the cylinder space behind the piston in each of the arrangements and the cylinder space in front of the piston in the other of the arrangements, such that in operation mutual pressure build up in the cylinder spaces of the arrangements is effective to hinder lateral movements of the vehicle body relative to the axle, but the hydraulic piston and cylinder arrangements do not appreciably impede vertical movements of the vehicle body.

4. A device for hindering lateral movement of a motor vehicle body relative to an axle of the vehicle, comprising an opposed pair of hydraulic piston and cylinder arrangements which are arranged symmetrically with respect to the longitudinal center plane of the vehicle and are hingedly connected to respective points on the vehicle body and to a common point on the axle and are each disposed substantially parallel to the axle, and respective hydraulic connections between the cylinder space behind the piston in each of the arrangements and the cylinder space in front of the piston in the other of the arrangements, such that in operation mutual pressure build up in the cylinder spaces of the arrangements is effective to hinder lateral movements of the vehicle body relative to the axle, but the hydraulic piston and cylinder arrangements do not appreciably impede vertical movements of the vehicle body.

5. A motor vehicle comprising a body, a pair of steerable front wheels, a pair of rear wheels carried by outboard portions of a rigid rear axle that includes a differential housing, a pair of links which are rigidly connected at their rear ends to the rear axle and are hingedly connected at their front ends to the body, a pair of coil springs interposed between the rear axle and the body, and a device for hindering lateral movement of the body relative to the rear axle, the said device comprising an opposed pair of hydraulic piston and cylinder arrangements each of which is hingedly connected to respective points on the body and to a common point on the differential housing, and is disposed at an angle of less than 90° relative to the respective outboard portion of the axle, and respective hydraulic connections between the cylinder space behind the piston in each of the arrangements and the cylinder space in front of the piston in the other of the arrangements, such that in operation mutual pressure build up in the cylinder spaces of the arrangements is effective to hinder lateral movements of the vehicle body relative to the axle, but the hydraulic piston and cylinder arrangements do not appreciably impede vertical movements of the vehicle body.